US006011877A

United States Patent [19]

Ishikawa et al.

[11] Patent Number: 6,011,877

[45] Date of Patent: Jan. 4, 2000

[54] APPARATUS AND METHOD FOR DETERMINING THE DIRECTIONAL ORIENTATION OF A DOCUMENT IMAGE BASED UPON THE LOCATION OF DETECTED PUNCTUATION MARKS WITHIN THE DOCUMENT IMAGE

[75] Inventors: Atsushi Ishikawa, Okazaki; Akio Nakajima, Toyokawa, both of Japan

[73] Assignee: Minolta Co., Ltd., Osaka, Japan

[21] Appl. No.: 08/762,256

[22] Filed: Dec. 9, 1996

Related U.S. Application Data

[63] Continuation of application No. 08/294,949, Aug. 24, 1994, abandoned.

[30] Foreign Application Priority Data

Aug. 26, 1993 [JP] Japan .................................... 5-211713

[51] Int. Cl.[7] ........................................ G06T 3/60

[52] U.S. Cl. ........................... 382/290; 382/291; 707/531

[58] Field of Search .................................... 382/198, 289, 382/290, 296, 297, 177, 287, 291, 286, 197, 195, 192, 173, 293, 276, 187, 203, 229; 707/531, 530, 500

[56] References Cited

U.S. PATENT DOCUMENTS

| | | | |
|---|---|---|---|
| 4,481,665 | 11/1984 | Ota | 382/102 |
| 4,591,884 | 5/1986 | Miyamoto et al. | 346/153.1 |
| 4,672,462 | 6/1987 | Yamada | 358/401 |
| 5,077,811 | 12/1991 | Onda | 382/46 |
| 5,239,388 | 8/1993 | Matsumoto | 358/448 |
| 5,245,674 | 9/1993 | Cass et al. | 382/16 |
| 5,245,676 | 9/1993 | Spitz | 382/46 |
| 5,282,065 | 1/1994 | Rackman | 358/488 |
| 5,373,566 | 12/1994 | Murdock | 382/156 |
| 5,383,754 | 1/1995 | Sumida et al. | 412/11 |
| 5,436,983 | 7/1995 | Bernzott et al. | 382/229 |
| 5,517,578 | 5/1996 | Altman et al. | 382/181 |

*Primary Examiner*—Edward L. Coles
*Assistant Examiner*—David Rosenblum
*Attorney, Agent, or Firm*—Sidley & Austin

[57] ABSTRACT

An image forming apparatus includes an image reading device which extracts character images from an original document image read by an image reader. The reading device further extracts an area of predetermined size including a single character from the extracted character images, and detects punctuation marks among characters included in the respective extracted areas based on a distribution of image elements in the respective extracted area so as to discriminate the directional orientation of the character image based on a position of punctuation marks. Alternatively, the reading device detects the presence of white space in the extracted character images so as to discriminate the directional orientation of the character images based on a distribution of the detected white space.

5 Claims, 17 Drawing Sheets

| ADDRESS | FST • WHTj | LST • WHTj |
|---|---|---|
| 0 | 0 | 0 |
| 1 | 0 | 0 |
| | : | : |
| k - 1 | 0 | 0 |
| k | FIRST DATA OTHER THAN 0 | FIRST DATA OTHER THAN 0 |
| | : | : |
| l | MINIMUM VALUE OF FST • WHTj | * |
| | : | : |
| m | * | MAXIMUM VALUE OF LST • WHTj |
| | : | : |
| n | LAST DATA OTHER THAN 0 | LAST DATA OTHER THAN 0 |
| | 0 | 0 |
| | 0 | 0 |
| | : | : |

100
CPU
4
ROM
114
RAM
124
I/O
77
IMAGE FORMATION SYSTEM SENSOR
I/O
EACH PART OF IMAGE FORMATION SYSTEM
CPU TIMING REGULATE
5
ROM
115
RAM
125
PRINT CONTROL SEC.
40
LDI
61
SERIAL I/O
CPU IMAGE PROCESS
2
ROM
112
RAM
122
IMAGE SIGNAL PROCESS SEC.
20
CCD
16
MEMORY UNIT
30
CPU
3
RAM
123
OPERATION PANEL
OP
CPU
1
ROM
111
RAM
121
I/O
OPERATION KEY
I/O
DISPLAY LED

| PAGE | ORIGINAL LONGITUDINAL LENGTH | ORIGINAL LATERAL LENGTH | ORIGINAL PLACEMENT DIRECTION |
|---|---|---|---|
| 1 | 2 9 7 | 2 1 0 | VERTICAL |
| 2 | 2 1 0 | 2 9 7 | HORIZONTAL |
| 3 | 3 6 4 | 2 5 7 | VERTICAL |
| ⋮ | | | |

| ADDRESS | FST • WHTj | LST • WHTj |
|---|---|---|
| 0 | 0 | 0 |
| l | 0 | 0 |
| | ⋮ | ⋮ |
| k − l | 0 | 0 |
| k | FIRST DATA OTHER THAN 0 | FIRST DATA OTHER THAN 0 |
| | ⋮ | ⋮ |
| l | MINIMUM VALUE OF FST • WHTj | * |
| | ⋮ | ⋮ |
| m | * | MAXIMUM VALUE OF LST • WHTj |
| | ⋮ | ⋮ |
| n | LAST DATA OTHER THAN 0 | LAST DATA OTHER THAN 0 |
| | 0 | 0 |
| | 0 | 0 |
| | ⋮ | ⋮ |

*FIG. 5*

FIG. 10
| AREA | PAGE | CHARACTER DIRECTION | DOCUMENT TYPE | | ADDITIONAL INFORMATION ABOUT COMPRESSION AND EXPANSION |
|---|---|---|---|---|---|
| | | | I | II | |
| 0 0 | 1 | TOP | VERTICAL WRITING | LANDSCAPE | |
| 0 1 | 2 | BOTTOM | HORIZONTAL WRITING | PORTRAIT | |
| 0 2 | 3 | LEFT | VERTICAL WRITING | LANDSCAPE | |
| ⋮ | | | | | |
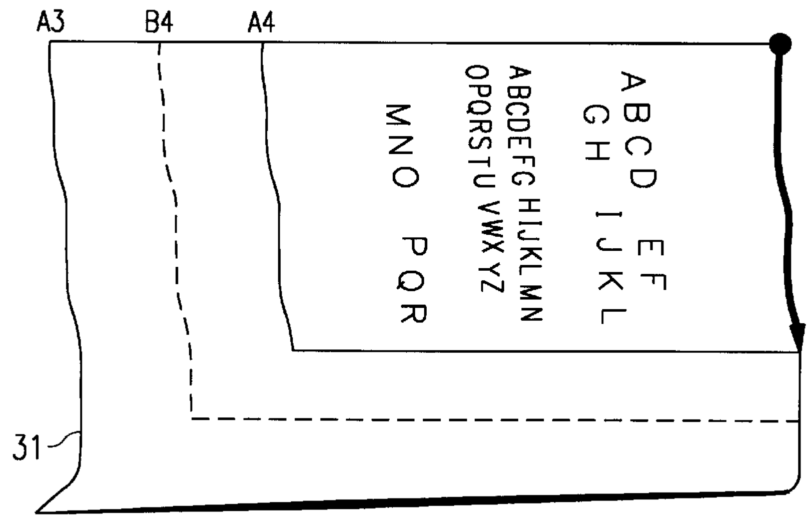
FIG. 11A
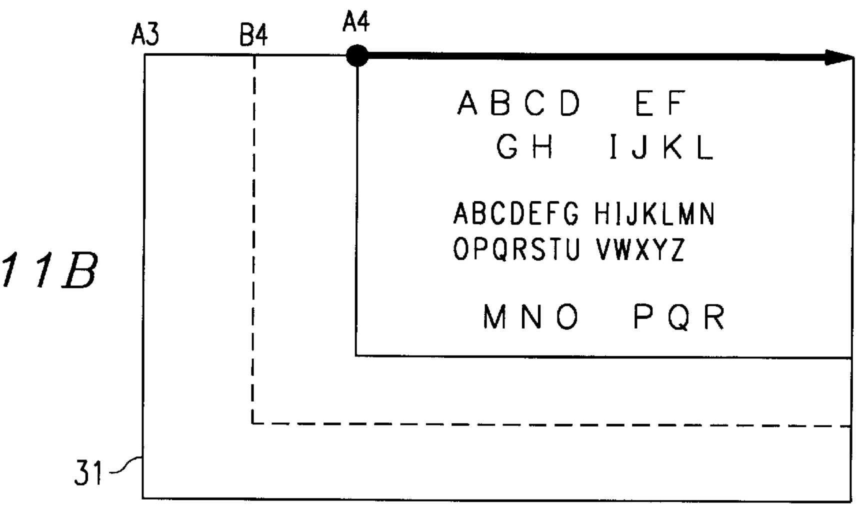
FIG. 11B FIG. 12A
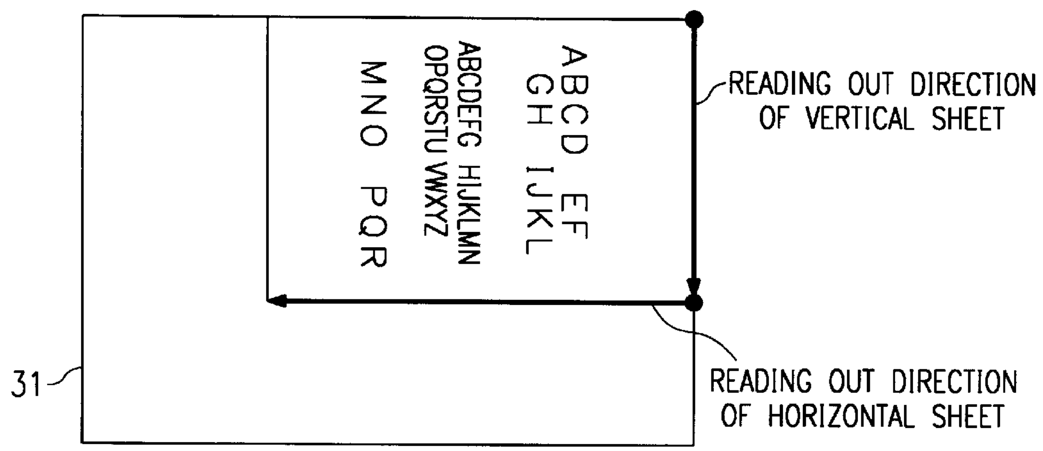
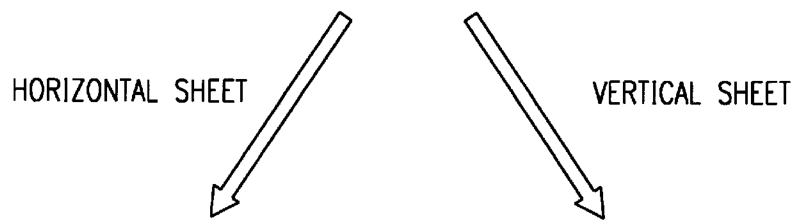
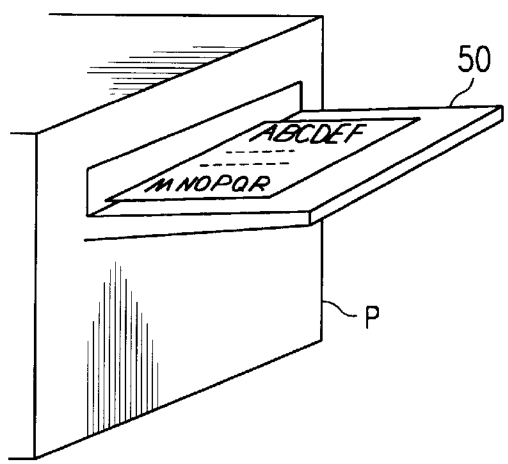
FIG. 12B
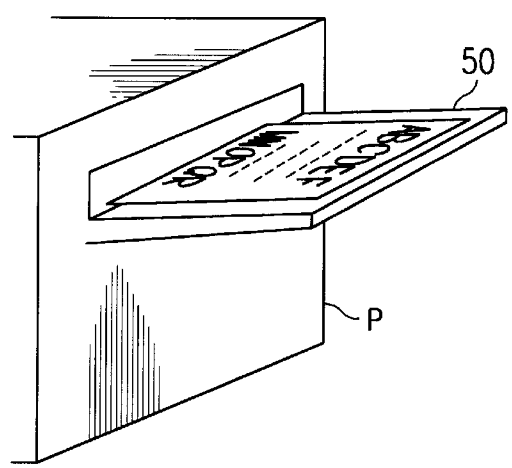
FIG. 12C FIG. 14B
(b')
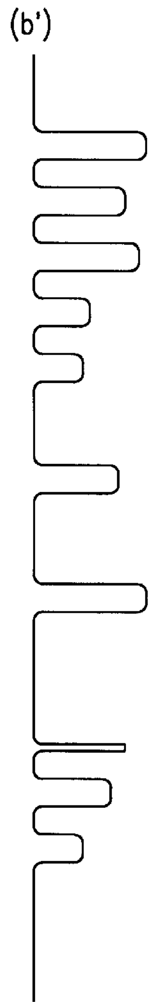
FIG. 14A
~~As a standard of estimation~~
of a lens efficiency, OTF
can be cited which is called
a responce function.
OTF is shown by
OTF(r, s) = MTF(r, s) e
wherein MTF is absolute value
MTF: Modulation Transfer
Function
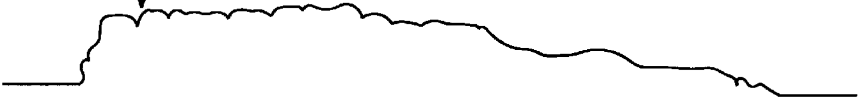
(a')
FIG. 14C As a standard of estimation of a lens efficiency, OTF can be cited which is called a responce function.
OTF is shown by OTF(r, s) = MTF(r, s) e wherein MTF is absolute value MTF: Modulation Transfer Function

BLACK IMAGE ELEMENT DISTRIBUTION OF EXTRACTED LINE

| QUADRANT | LINE DIRECTION | |
|---|---|---|
| | DIRECTION A | DIRECTION B |
| 1 | VERTICAL UPWARD | HORIZONTAL DOWNWARD |
| 2 | HORIZONTAL RIGHTWARD | VERTICAL LEFTWARD |
| 3 | VERTICAL DOWNWARD | HORIZONTAL UPWARD |
| 4 | HORIZONTAL LEFTWARD | VERTICAL RIGHTWARD |

FIG. 16

| | | DOCUMENT TYPE | |
|---|---|---|---|
| | | VERTICAL WRITING | HORIZONTAL WRITING |
| LINE DIRECTION | SHORT EDGE DIRECTION | LANDSCAPE | PORTRAIT |
| | LONG EDGE DIRECTION | PORTRAIT | LANDSCAPE |

FIG. 17

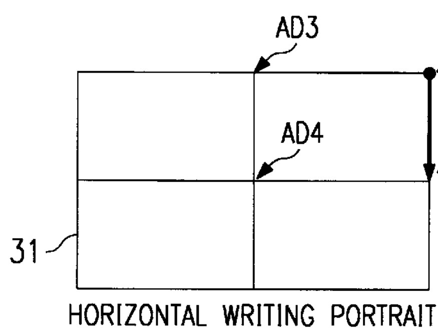

HORIZONTAL WRITING PORTRAIT

FIG. 19A

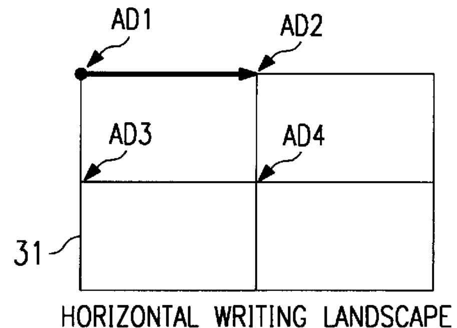

HORIZONTAL WRITING LANDSCAPE

FIG. 19B

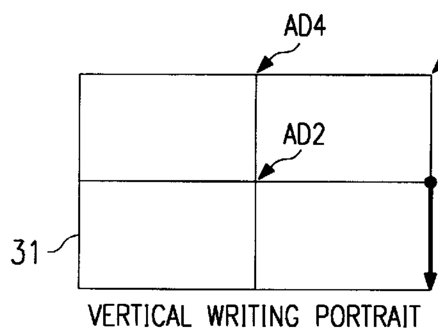

VERTICAL WRITING PORTRAIT

FIG. 19C

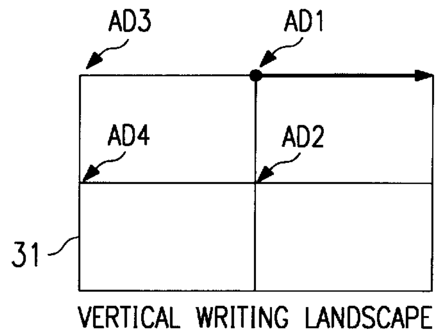

VERTICAL WRITING LANDSCAPE

FIG. 19D

APPARATUS AND METHOD FOR DETERMINING THE DIRECTIONAL ORIENTATION OF A DOCUMENT IMAGE BASED UPON THE LOCATION OF DETECTED PUNCTUATION MARKS WITHIN THE DOCUMENT IMAGE

CROSS REFERENCE TO RELATED APPLICATIONS

This is a continuation of U.S. patent application Ser. No. 08/294,949 filed Aug. 24, 1994, now abandoned.

BACKGROUND OF THE INVENTION

1. Field of the Invention

The present invention relates to an image reading device for reading an original document image, and more specifically relates to an image reading device capable of discriminating the direction of an original document image. The present invention further relates to an image forming apparatus provided with the image reading device.

2. Description of the Related Art

It has been proposed to provide in conventional image reading devices such as image readers, copying apparatus and the like, functions for discriminating the directional orientation of an original document image so as to improve operational characteristics relative to a user. In such an image reading device, the directional orientation of an .original document image is discriminated and said original document image is rotated to a normal directional orientation for output, such that a user sets the original document directly on the image reading device without necessarily being cognizant of the top and bottom of said original document.

For example, U.S. Pat. No. 5,077,811 discloses a device provided with functions for detecting the directional orientation of characters obtained by reading of an original document image by means of comparison with reference characters.

In the device of the aforesaid disclosure, the process of recognizing characters requires a long time due to the complexity of said process, and errors in detection may readily occur. The aforesaid device requires substantial memory for storing the aforesaid reference characters. Accordingly, a very large memory capacity must be provided in the case of character types having a large amount of characters such as in the Japanese language.

There are also image reading devices wherein directional orientation of an original document can be discriminated by discriminating the position of page numbers and headings appended to said original document. Although such image reading devices can reduce the processing time for discriminating the directional orientation of an original document image, they possess certain disadvantages inasmuch as the directional orientation of an original document cannot be discriminated when page numbers or headings are not present.

SUMMARY OF THE INVENTION

A main object of the present invention is to provide an image reading device capable of rapidly and accurately detecting the directional orientation of characters.

Another object of the present invention is to provide an image reading device that does not require substantial memory.

A further object of the present invention is to provide an image reading device capable of discriminating the directional orientation of an original document image even when page numbers and headings are absent from the original document.

A still further object of the present invention is to provide an image forming apparatus that improves operating characteristics relative to users by using the aforesaid image reading device.

These and other objects of the present invention are achieved by providing an image reading device comprising image reading means for reading original document images, extracting means for extracting character images from an image read by said image reading means and extracting an area of predetermined size including a single character from said extracted character image, detecting means for detecting punctuation marks among characters included in the respective areas extracted by said extracting means, and discriminating means for discriminating the directional orientation of said character image based on a distribution within said area of image elements forming punctuation marks detected by said detecting means.

These and other objects of the present invention are achieved by providing an image reading device comprising image reading means for reading original document images, extracting means for extracting a character image from an image read by said reading means, detecting means for detecting presence of white space within the character image extracted by said extracting means, and discriminating means for discriminating the directional orientation of the character image based on the distribution of the white space detected by said detecting means.

These and other objects, advantages and features of the invention will become apparent from the following description thereof taken in conjunction with the accompanying drawing which illustrate specific embodiments of the invention.

BRIEF DESCRIPTION OF THE DRAWINGS

In the following description, like parts are designated by like reference numbers throughout the several drawings.

FIG. 5 is an illustration showing RAM 122 accommodating data for document size detection;

FIG. 10 shows management table MT;

FIGS. 11A and 11B are illustrations showing the method of writing image data from code memory 37 to image memory 31;

FIGS. 12A, 12B, and 12C show the method of reading image data from image memory 31 for printing;

FIGS. 14A, 14B, 14C, 14D and 14E show the method for line extraction and the method for character extraction, respectively;

FIG. 16 shows the method for discriminating the directional orientation of the characters and the type of document (i.e., vertical writing or horizontal writing) based on punctuation mark positioning;

FIG. 17 is an illustration showing the method for discriminating the document type (portrait or landscape) based on the directional orientation of the lines (short side dimension or long side dimension) and the document type (vertical writing or horizontal writing);

FIGS. 19A, 19B, 19C, and 19D are plan views showing the method of writing image data to image memory 31 when making a 4-in-1 copy;

DETAILED DESCRIPTION OF THE PREFERRED EMBODIMENTS

The preferred embodiments of the present invention are described hereinafter by way of a copying apparatus.

(1) First Embodiment

Figure 1:
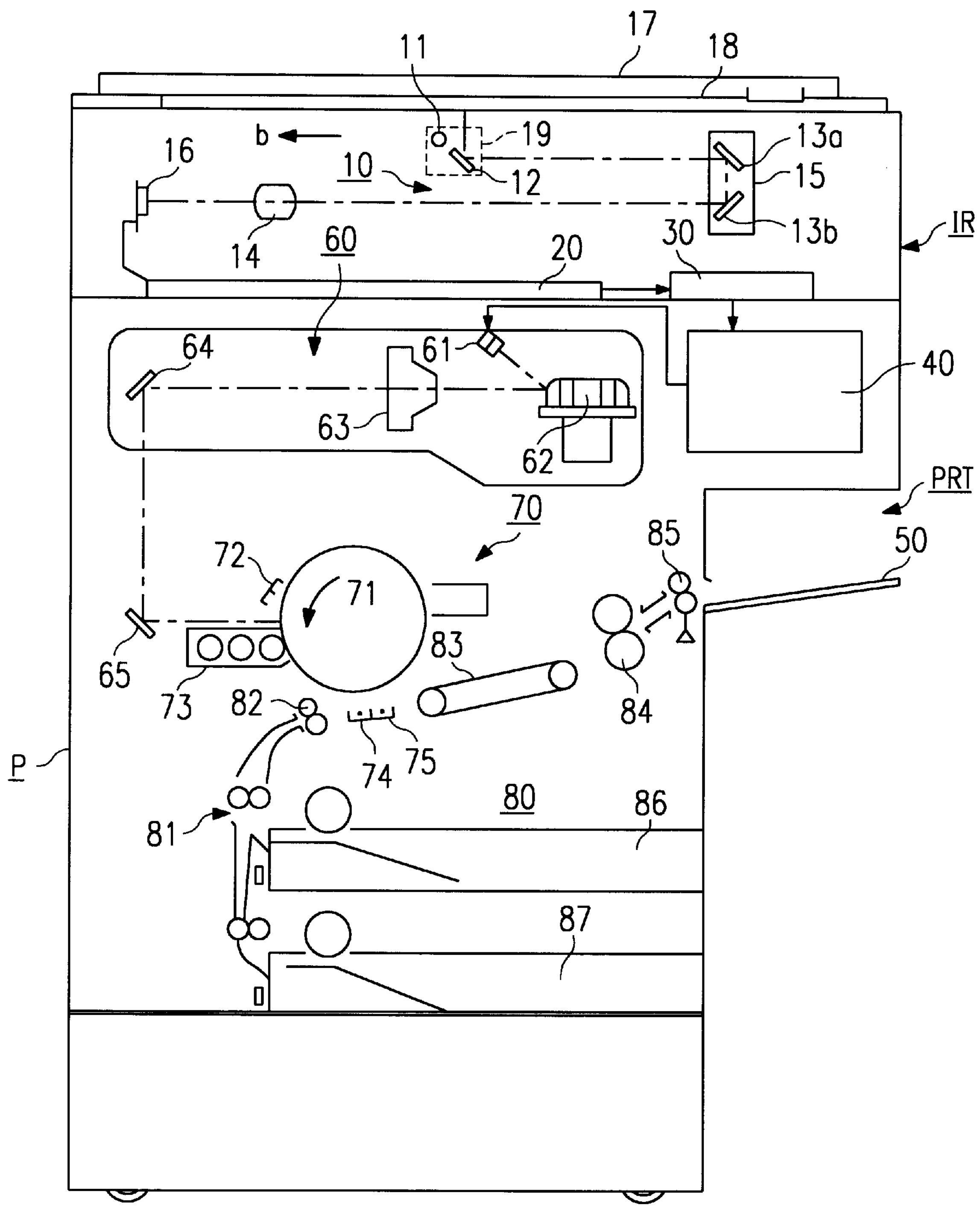
FIG. 1 is a diagrammatic view of a copying apparatus P of the present invention.

FIG. 1 is a diagrammatic illustration showing a digital copying apparatus P of a first embodiment of the present invention. As shown in FIG. 1, copying apparatus P is provided with a reading device IR for reading original document images, and a printer device PRT for outputting read images. Reading device IR comprises a scanning unit 10 which reads original documents and converts the read data to image signals, image signal processing section 20 which processes image signals transmitted from scanning unit 10, a memory unit 30 which stores in memory the image data transmitted from image signal processing section 20. Printer device PRT comprises a print processing section 40 which processes print output of image data transmitted from memory unit 30, optical unit 60 which actuates a laser diode in accordance with image data transmitted from print processing-section 40, image forming a unit 70 for forming image on a copy sheet by an electrophotographic method in accordance with the laser light emitted by optical unit 60, and transport unit 80 which transports copy sheets for use in image formation.

The image forming process accomplished by copying apparatus P is briefly described hereinafter.

Scanning unit 10 comprises lamp 11 for illuminating an original document placed on document platen 18, first mirror 12 for directing the light reflected by an original document to a condenser lens 14 via second mirror 13*a* and third mirror 13*b*, and line sensor 16 for reading the light transmitted through lens 14. When an original document image is read, scanner 19, which incorporates lamp 11 and first mirror 12, and slider 15, which incorporates second mirror 13*a* and third mirror 13*b*, are moved at predetermined speeds in the arrow b direction in the drawing (subscan direction). The original document image is read by line sensor 16 in conjunction with the aforesaid movement. Line sensor 16 is provided with a plurality of elements (charge-coupled devices (CCD)) arrayed in a direction perpendicular to subscan direction b, said array direction being called the main scan direction.

The image signals outputted from line sensor 16 are transmitted sequentially through image signal processing section 20, memory unit 30, and print processing section 40 to optical unit 60. Image signal processing section 20, memory unit 30, and print processing section 40 are described in detail later.

Optical unit 60 comprises semiconductor laser 61, polygonal mirror 62, principal lens 63, and reflecting mirrors 64 and 65. When image data are transmitted from print processing section 40, semiconductor laser 61 generates a laser beam, which is modulated in accordance with the image data. The laser beam is deflected by polygonal mirror 62, and is directed to the surface of photosensitive drum 71 of image forming unit 70 by means of principal lens 63 and reflecting mirrors 64 and 65. Thus, the laser beam irradiates the surface of photosensitive drum 71 one line at a time in the main scan direction by means of the rotation of polygonal mirror 62.

Image forming unit 70 forms images on a copy sheet by the following well-known electrophotographic process. That is, the surface of photosensitive drum 71 is uniformly charged by charger 72, and an electrostatic latent image corresponding to the image data is formed on the charged surface of said photosensitive drum 71 by the laser beam emitted from the optical unit 60. The aforesaid electrostatic latent image is developed by developing device 73, thereby forming a toner image. This toner image is transferred onto a copy sheet by means of transfer charger 74, and said copy sheet is separated from photosensitive drum 71 by means of separation charger 75.

Transport unit 80 feeds a copy sheet from cassettes 86 and 87 along guide 81, and transports said copy sheet to image forming unit 70 by means of a predetermined timing via timing roller 82. When the toner image is transferred onto the copy sheet in image forming unit 70, said copy sheet is transported to fixing roller 84 by transport belt 83. Thereafter, the toner image is fused onto said copy sheet by heat and pressure applied by fixing roller 84, said copy sheet is discharged to tray 50 by discharge roller 85, and the image forming process is completed.

An operation panel not shown in the illustrations is provided on the top of copying apparatus P, such that a user operates the keys provided on said operation panel to select copy modes, and set copy conditions such as copy magnification, image density and the like. Copying apparatus P is provided with a normal image forming mode and N-in-1 modes (2-in-1 mode and 4-in-1 mode), which are selectable by operating the keys provided on the operation panel. In the normal mode, an image of a single original document is read, and an image corresponding to the image data is formed on a single copy sheet. In the N-in-1 mode, the images of two or four original documents are read, and images corresponding to the image data are reduced ½ or ¼, converted to a predetermined array, and said images are formed on a single copy sheet.

The control section of copying apparatus P is described hereinafter.

Figure 2:
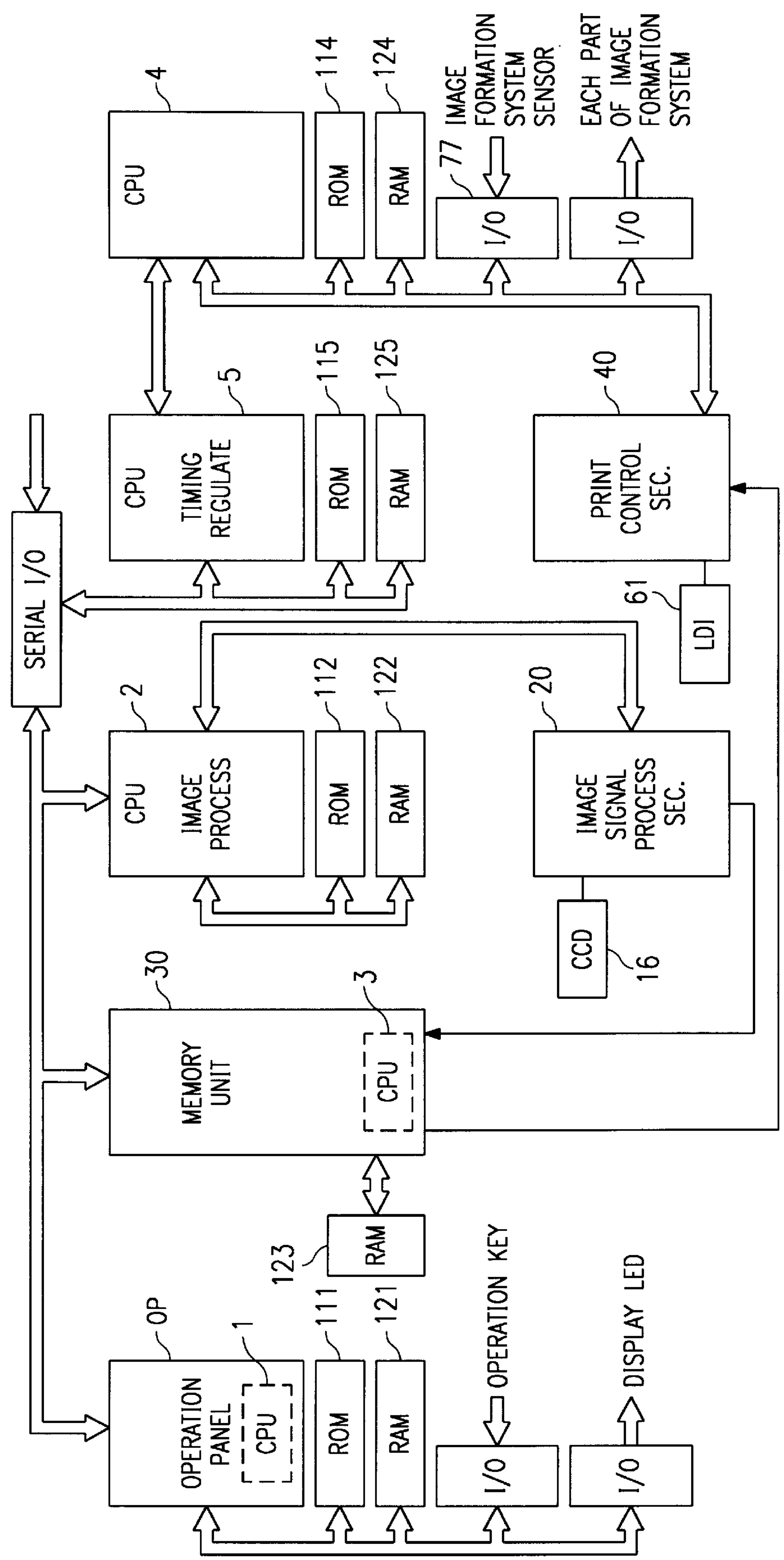
FIG. 2 is a circuit diagram of the control section 100 of the copying apparatus P.

FIG. 2 is a block diagram showing the construction of control section 100 of copying apparatus P. As shown in FIG. 2, control section 100 comprises five individual central processing units (CPU) 1~5. Each of the aforesaid CPUs 1~5 are provided with ROMs 111~115 for storing programs, and RAMs 121~125 which provide work areas for executing programs. CPU 1 is provided in the operation panel section OP, and CPU 3 is provided in memory unit 30.

CPU 1 executes controls related to displays and signal input from each of the various operation keys on the operation panel provided on the operation panel section OP. CPU 2 executes controls for actuating scanning unit 10 and controls of each part of image processing section 20. CPU 3 processes image data transmitted from signal processing section 20 as required, and outputs said data to print processing section 40 by means of controlling memory unit 30.

CPU 4 executes control of optical unit 60, image forming unit 70, and transporting unit 80. CPU 4 receives signals transmitted from copy sheet sensors provided within cassettes 86 and 87 through input/output (I/O) port 77 provided as an image formation unit sensor, and information related to copy sheet size and directional orientation is managed within said CPU 4. CPU 5 executes processing for setting operation modes and general timing adjustments for control section 100. CPUs 1~4 are connected to CPU 5 by a bus line, so as to be capable of mutually exchanging data and the like.

The construction of the control circuit of image signal processing section 20 is described hereinafter.

Figure 3:
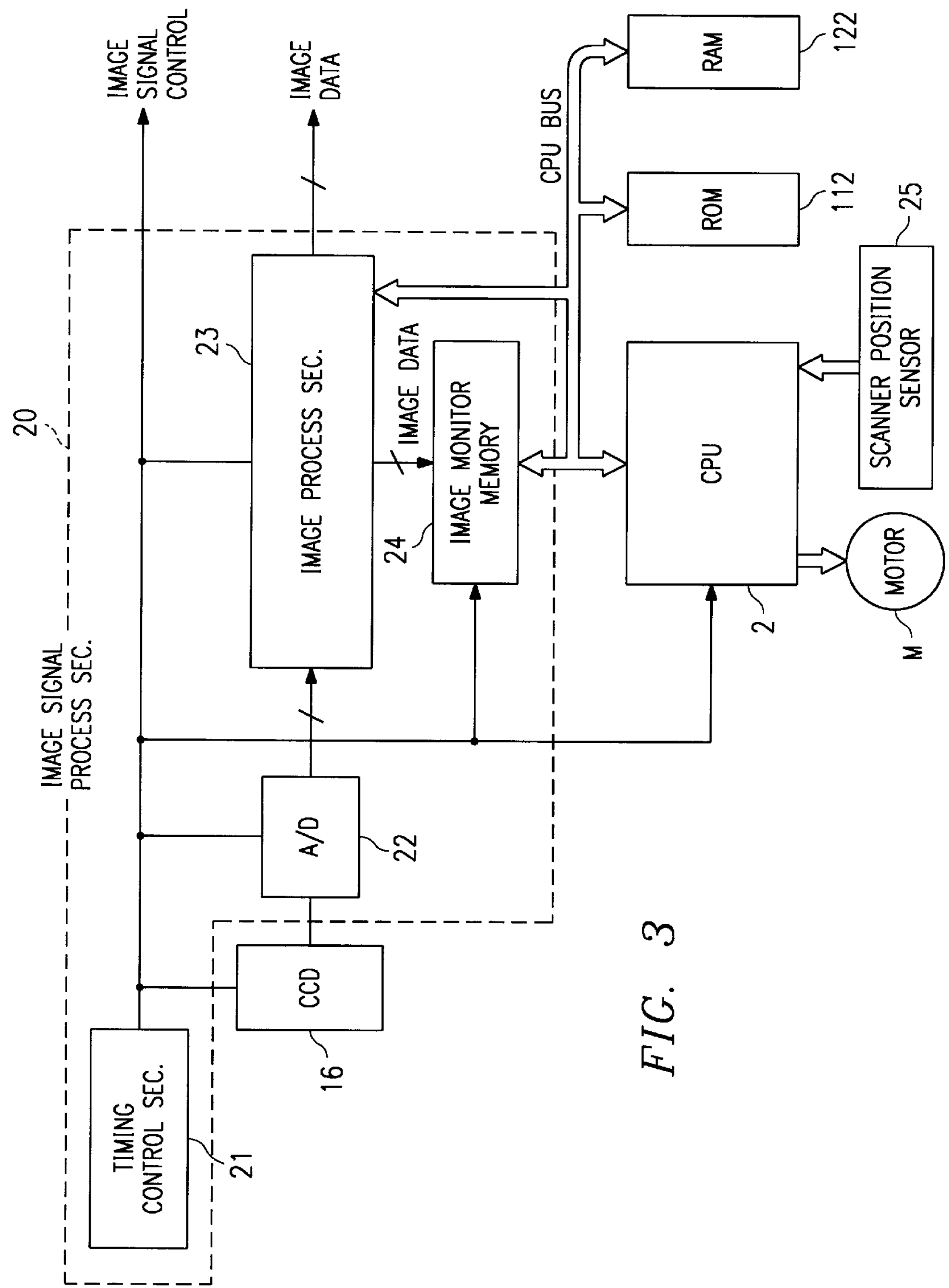
FIG. 3 is a circuit diagram of the reading device IR.

FIG. 3 is a block diagram showing the circuit of image signal processing section 20. CPU 2, ROM 112, RAM 122, and line sensor 16 of FIG. 3 correspond to those described in FIG. 2. Image reading synchronization signals are supplied to each block by timing control section 21. Line sensor 16 scans the original document in the main scan direction, and generates document read signals. These generated signals are converted to digital signals by analog-to-digital (A/D) converter 22, which are transmitted to image processing section 23. In image processing section 23, image quality correction processes are executed such as shading correction, modulation transfer function (MTF) correction, gamma correction and the like, and processed image data are transmitted to memory unit 30. Image monitor memory 24 stores image data in one-line segments via instructions from CPU 2. CPU 2 executes all controls for the reading device such as setting parameters to image process section 23, scan control via scanning motor actuation, and communication with host CPU 5.

CPU 2 detects the size of the original document by a prescanning operation by scanning section 10 via instructions from host CPU. 5. Thus, CPU 2 controls scanning motor M in accordance with scanner position information transmitted from scanner position sensor 25, causes scanner 19 to scan in the subscan direction, and determines whether or not the read image is an original document. That is, detection of white on the mirror surface of document cover 17 (refer to FIG. 1) is perceived as an original document. Scanning may also be accomplished with document cover 17 in an open condition.

With a timing corresponding to the subscan position, image data are stored in image monitor memory 24, and thereafter said image data are read out, and the size of the original document is detected from the image data content and monitor position information. The aforesaid detection result is transmitted to host CPU 5.

Figures 4, 6:
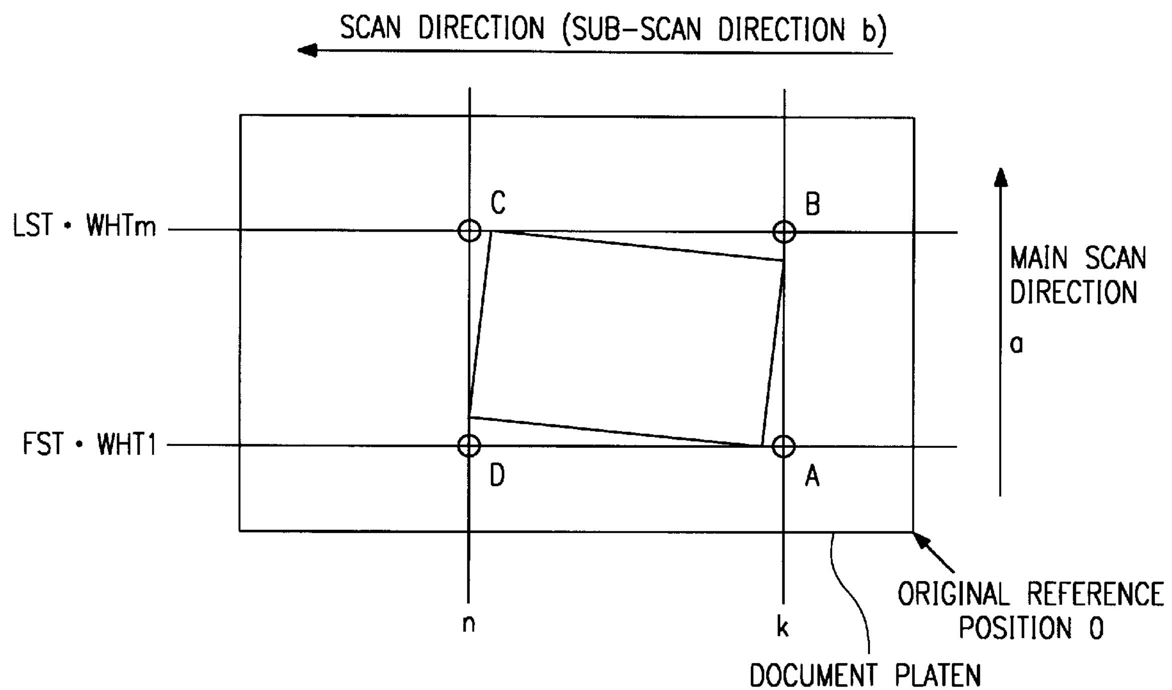
FIG. 4 is an illustration showing the document size detection method.
FIG. 6 is an illustration showing document management table DT.

FIG. 4 is an illustration showing the method for detecting the size of original documents. FIG. 4 is a view from the top of document platen 18 of FIG. 1. The position of the document and the document dimensions detected during prescanning are determined by storing the reference position 0 beforehand; by detecting:

(a) the front end position of the original document in the main scan direction a, (this position is designated in FIG. 4 as FST●WHTl, (mm)), (b) the rear end position of the original document in the main scan direction a, (this position is designated in FIG. 4 as LST●WHTm, (mm)), (c) the front end position of the original document in the sub scan direction b, (this position is designated in FIG. 4 as k (mm)), and (d) the rear end position of the original document in the sub scan direction b, (this position is designated in FIG. 4 as n (mm));

and then by calculating:

(c) a first original document dimension in the sub scan direction b, (n−k (mm)), and (d) a second original document dimension in the main scan direction a, (LST●WHTm−FST●WHT (mm)).

As shown in FIG. 4, CPU 2 stores the document platen reference position 0 beforehand. In the prescanning process, image scanning is accomplished relative to the entire surface of the document platen. CPU 2 periodically stores the image information in image monitor memory 24 during the prescan, and scans the image data from reference position 0 in the main scanning direction a. The address (FST○WHTj) at which the first white level was detected in the main scan direction a and the address (LST○WHTj) at which the last white level was detected in the main scan direction a for each line (line j in the subscan direction) are stored in RAM 122. FIG. 5 shows the form by which data are written to RAM 122. As shown in FIG. 5, address 0 is specified when a white level is not detected.

After completion of the prescan, the original document size and position are determined using the data stored in RAM 122. That is, the data stored in RAM 122 is sequentially read out, and data at the first non-zero (0) address k is designated the document leading edge position in the subscan direction, and the last non-zero (0) address n is designated the document trailing edge position in the subscan direction. Document dimension X in the subscan direction is designated (n−k). The minimum value FST○WHT1 among FST○WHTj stored in RAM 122 is designated the document leading edge position in the main scan direction, and the minimum value LST○WHTm among LST○WHTj is designated the document trailing edge position in the main scan direction. Document dimension Y in the main scan direction is designated (LST○WHTm-FST○WHT1). The position and dimensions of the original document are detected as described above, and the size nearest to a set format size according to the detected vertical and horizontal dimensions is transmitted to host CPU 5 as the original document size. CPU 5 receives the aforesaid data and generates a document management table DT in RAM 125 such as shown in FIG. 6. CPU 5 determines that the document is positioned horizontally when document dimension Y is greater than document dimension X, and determines the document is positioned vertically under all other conditions. Placement of an original such that the long edge of said original is parallel to the subscan direction is designated vertical placement, and placement of an original such that the long edge of said original is perpendicular to the subscan direction is designated horizontal placement.

After completion of the prescan, CPU 2 reads the document image in another scan, and outputs image data from image processing section 23 to memory unit 30.

Figure 7:
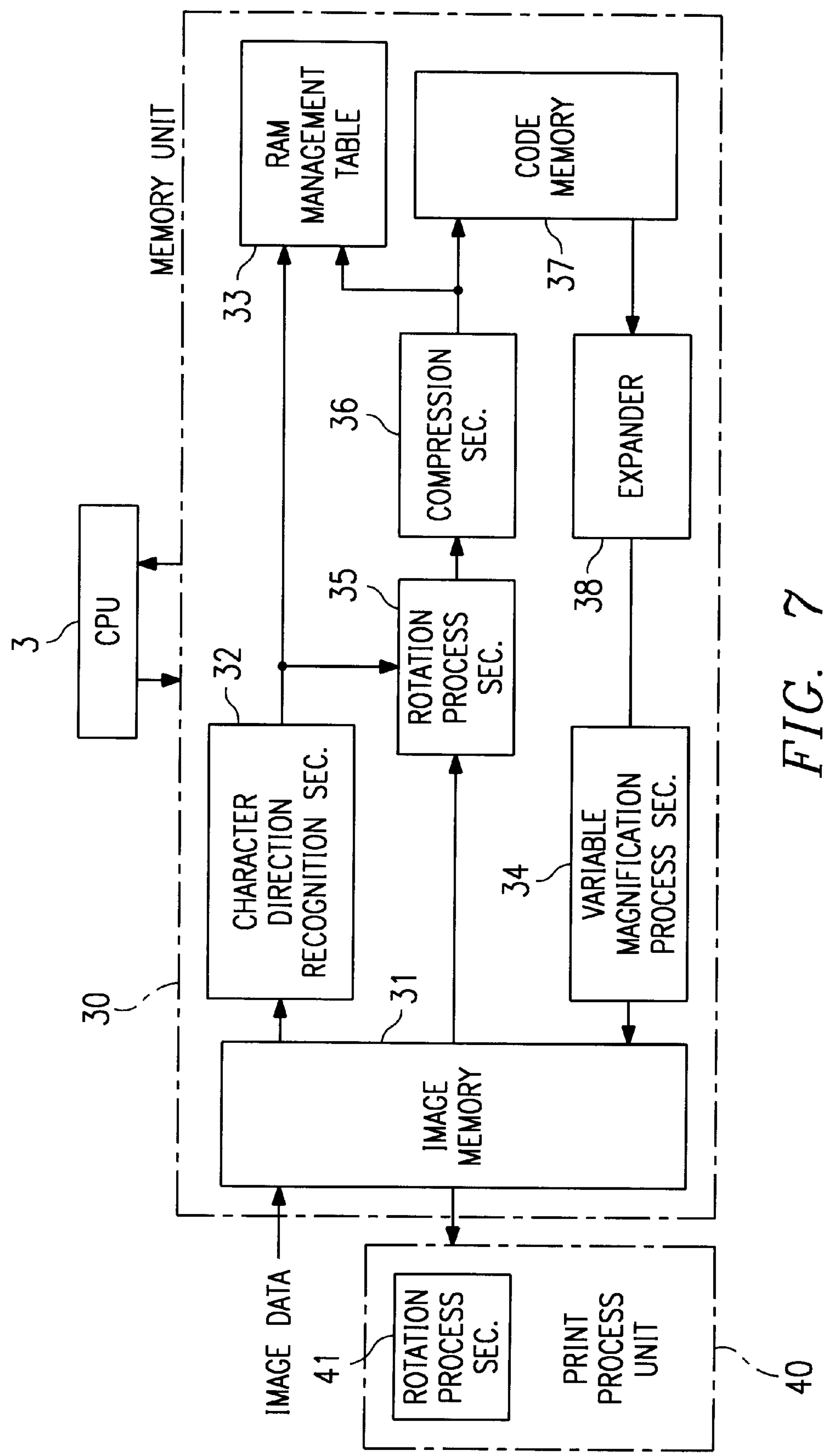
FIG. 7 is a circuit diagram showing memory unit 30.

FIG. 7 is a block diagram showing memory unit 30. As shown in FIG. 7, memory unit 30 is controlled by CPU 3, and comprises image memory 31 for storing images read from original documents, character direction recognition section 32 for recognizing the direction of the character image of an original, RAM 33 for creating a management table MT, variable magnification processing section 34, rotation process section 35, compression section 36 for compressing image data, code memory 37 for storing compressed data, and expander 38 for expanding compressed data transmitted from code memory 37.

Figure 8A:
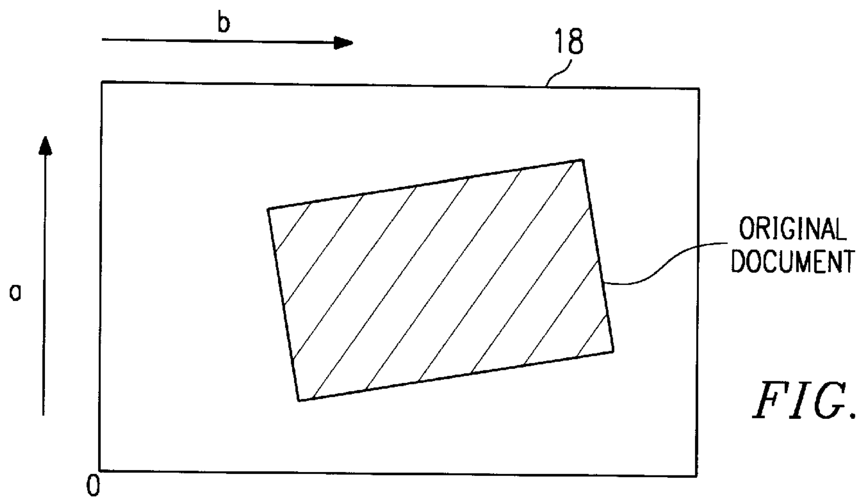
FIGS. 8A and 8B are illustrations showing the correspondence between document platen 18 and image memory 31.
Figure 8B:
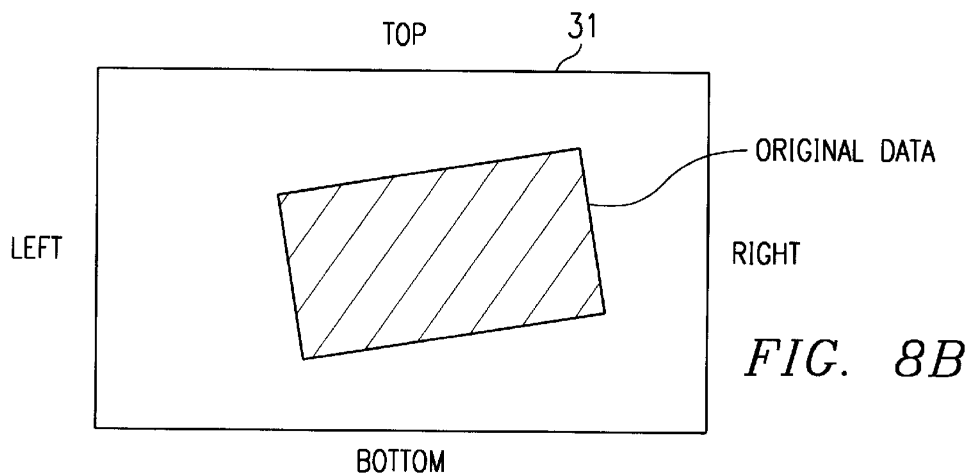

FIGS. 8A and 8B are illustrations showing the correspondence between image memory 31 and document platen 18. The illustration of FIG. 8A shows document platen 18, wherein the portion shaded by diagonal lines indicates the original document placed on document platen 18. The original document is shown as viewed through the glass of document platen 18. Arrows a and b in the drawing indicate the main scan direction and the subscan direction, respectively, and correspond to the directions shown in FIG. 4. The illustration of FIG. 8B shows the storing area of image memory 31; the area shaded by diagonal lines indicates the document image data read from the original document and stored in image memory 31.

Scanner 19 reads the image of an original document, placed as shown in FIG. 8A, one line at a time from the reference position 0 via line sensor 16 in the main scan direction a, while moving in the subscan direction b. Thus, the read document image data is stored in image memory 31 and corresponds to the read image area of document platen 18, as shown in FIG. 8B. For the purposes of this description, the vertical or horizontal orientation is determined relative to image memory 31, as shown in FIG. 8B.

Figure 9:
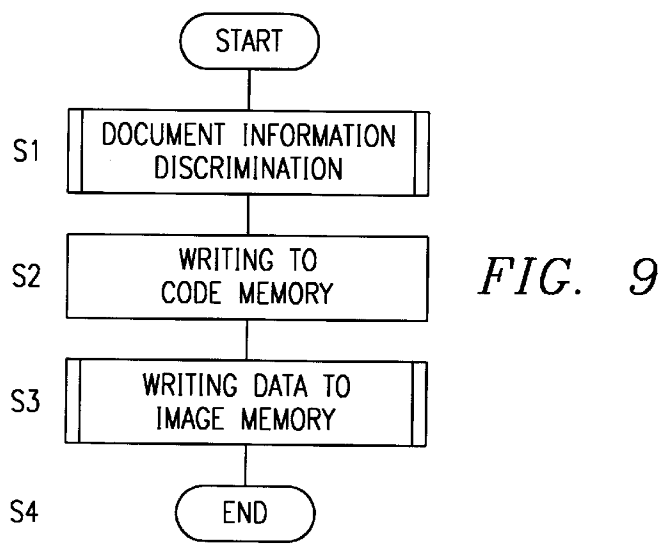
FIG. 9 is a flow chart showing processes executed by CPU 3.

FIG. 9 is a flow chart showing the processes executed by CPU 3. These processes executed by CPU 3 are described hereinafter with reference to FIGS. 7 and 9.

As shown in FIG. 9, when one page segments of image data are transmitted from image signal processing section 20 to image memory 31, in step S1, processes are executed to determine the character direction (which orientation among top, bottom, right and left the characters contained in the document placed on the document platen face) and document type (landscape or portrait orientation of the document, and vertical or horizontal writing). Portrait orientation indicates the document image faces the short edge direction of the original, and landscape orientation indicates the document image faces the long edge direction of the original.

The process of step S1 is described below with reference to FIG. 7. The image data is read out from image memory 31, and the character region within the image is extracted. The extracted character region is analyzed for character direction by mean of character direction recognition section 32. CPU 3 determines the document type based on the recognized character direction. The recognition method is fully described later by way of examples. Information relating to character direction and document type is outputted to rotation process section 35, and written to management table MT in RAM 33. Management table MT is described later.

In step S2, CPU 3 reads out the data from image memory 31, and said image data are rotated to a predetermined direction in rotation process section 35 by changing the readout address of image data from image memory 31 based on document information transmitted from character direction recognition section 32, and said data are then outputted to compressor 36. The data are then compressed by compressor 36, and the compressed data are stored in code memory 37. The code memory 37 is divided into memory areas in units of 32 bytes, the compressed data for each single page is stored in said areas in consideration of the controllability of simultaneous writing and readout of said data. Necessary types of additional information for the compression and expansion processes, e.g., compression method, data length, and page number of image data stored in each area of said code memory 37, are written to management table MT during each compression. Copying apparatus P is capable of storing images of a plurality of original documents.

FIG. 10 shows a management table MT. Management table MT comprises the additional information relating to the aforesaid compression and expansion, as well as the previously mentioned document information. The information contained in management table MT is erased when information for each one-page segment for printout is read from code memory 37 at a number corresponding to the copy number.

In step S3, after image memory 31 is cleared, data is read out from code memory 37, and said data are expanded by expander 38. Then, after the aforesaid data are subjected to magnification or reduction in variable magnification process section 34 in accordance with the copy mode and copy conditions set by the user on the operation panel, said data are written to image memory 31.

FIGS. 11A and 11B show the conditions under which the data read out from code memory 37 for printout are written to image memory 31. The arrows FIGS. 11A and 11B indicate the directions in which data are written. Since image data rotation is accomplished based on the document type in rotation section 35, as previously described, the image data transmitted from code memory 37 to image memory 31, if document type is the same, is normally in the same direction regardless of the direction in which a document is placed on document platen 18. That is, image data transmitted from code memory 37 through expander 38 are written in a rightward direction in the drawing if the document has a portrait orientation as in FIG. 11A, or are written in an upward direction if the document has a landscape orientation as in FIG. 11B.

Image data written to image memory 31 through code memory 37 are used to form an image on a copy sheet transported to print process section 40 via optical unit 60 and image forming unit 70. Print process section 40 accommodates a built-in rotation section 41, which changes the readout address and writing direction of image data transmitted from image memory 31 so as to rotate the printout image to coincide with the directional orientation of the copy sheets accommodated within cassettes 86 and 87 of transport unit 80. Thereafter, an image is formed on the copy sheet by means of optical unit 60, image forming unit 70, and transport unit 80, based on the image data outputted from print output section 40, and thereafter the copy sheet is discharged to tray 50, as shown in FIGS. 12B and 12C. Thus, an image can be outputted in a predetermined direction, for example, a direction readily visible to a user, regardless of the directional orientation of the original document.

Methods for determining character direction and document type are described hereinafter by way of specific examples.

Figure 13:
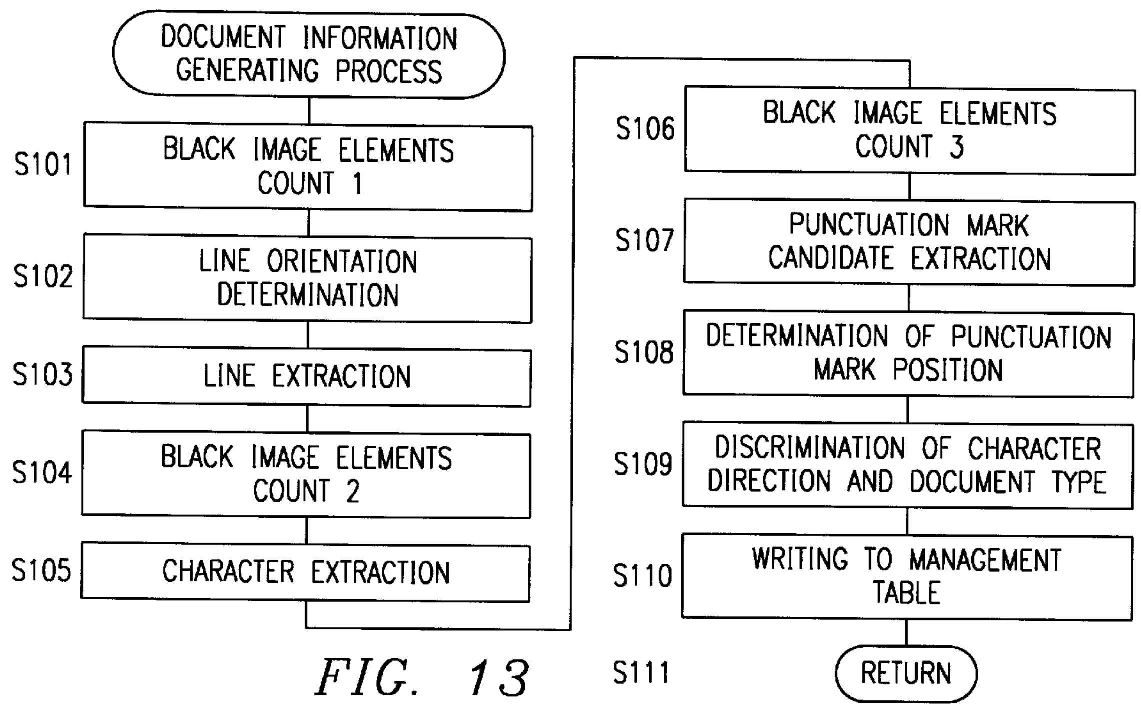
FIG. 13 is a flow chart of the process for discriminating document information.

FIG. 13 is a flow chart showing the document information discrimination process executed by CPU 3 (step S1 of FIG. 9). As shown in FIG. 13, in step S101, the number of black image elements are counted in the main scan direction a and subscan direction b relative to image data in image memory 31. In step S102, the distribution of black image elements are checked in each direction, and a determination is made as to whether each line forming a character image of an original document is oriented in the main scan direction or in the subscan direction of the original.

FIG. 14A, 14B, 14C, 14D, and 14E show the process for discriminating document information from image data stored in image memory 31 when the original document placed on document platen 18 has a horizontal orientation.

FIGS. 14A, 14B, and 14C show the processes of step S101 and step S102. CPU 3 calls up the image data along the main scan direction and subscan direction from image memory 31, and determines whether or not each image element is a black image element ([0] or [1]), and counts the number of black [1] image elements. Then, the distribution of the black image elements is checked relative to each direction via the results of the aforesaid image element counting. Item a' in FIG. 14B and item b' in FIG. 14C illustrate the distributions in both the aforesaid cases.

As shown in FIGS. 14B and 14C, distributions a' and b' have markedly dissimilar configurations. As shown in the drawings, when each line of an original document is aligned in the short edge direction of the document, data b' expresses a distribution of greatest bias. When each line of an original document is aligned in the long edge direction of the document, data a' expresses a distribution of greatest bias. Thus, each line forming the character image of the original document can be readily discriminated as to whether it aligns in the main scan direction or in the subscan direction by means of the difference in distribution of black image elements in each direction. Even when an original is placed vertically, discrimination of line direction is completely identical.

In step S103, line extraction is accomplished by recognizing the character image of the leading line along the discriminated line direction. In step S104, the number of black image elements are counted in the line direction of the extracted line. In step S105, character recognition (character extraction) is accomplished based on the distribution of black image elements.

Figures 14D, 14E:
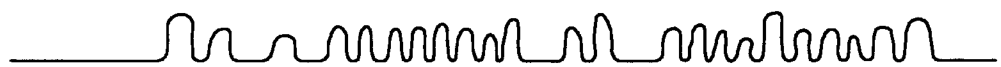

FIGS. 14D and 14E show the processes of steps S103~S105. As shown in the drawing, after the leading single line (digital portion) of the character image is extracted, the number of black image elements is counted along the direction of the character line. The distribution of black image elements in the single line segment is shown in the same drawing. Since a bias is generated by the distribution data relative to each character, the position of characters within said line can be readily recognized based on changes in said distribution, whereby character extraction is accomplished.

In step S106, the number of black image elements are calculated in the main scan direction and subscan direction of characters extracted in step S105, and their distribution in each direction is checked. In step S107, a punctuation mark candidate is selected based on the distribution of black image elements.

Figure 15:
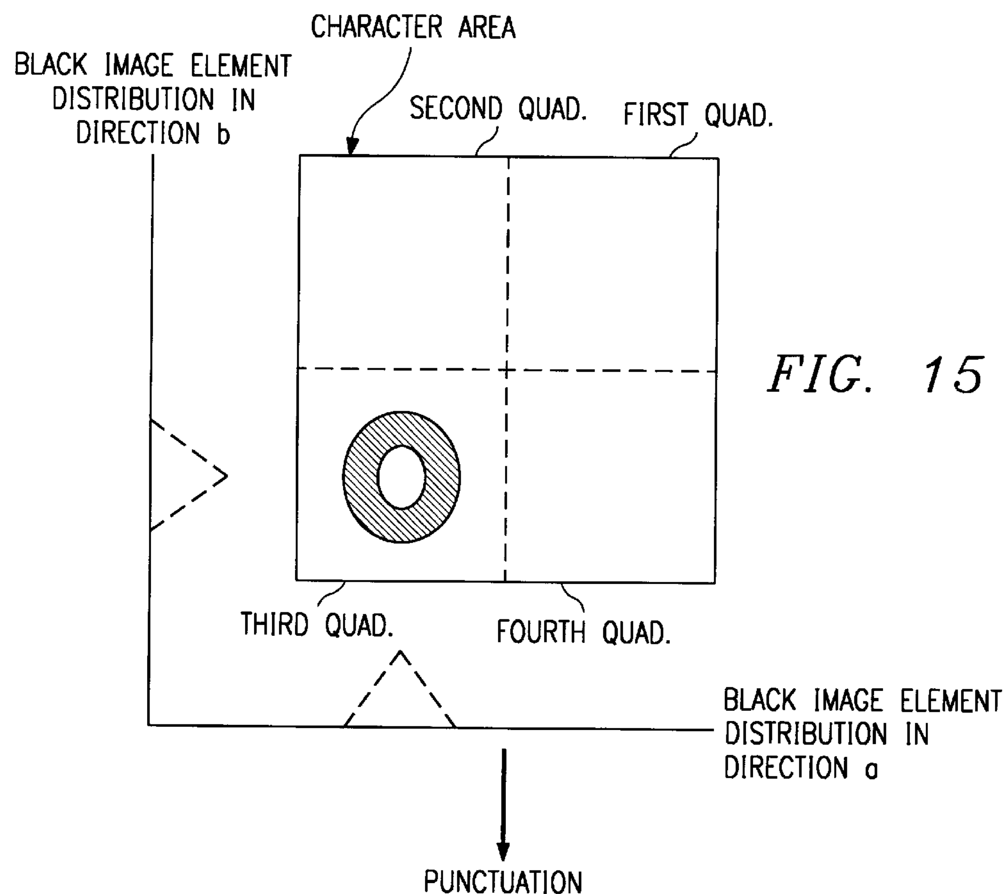
FIG. 15 is a plan view showing the punctuation mark discrimination method.

FIG. 15 is an illustration showing the condition of punctuation mark recognition executed in steps S106 and S107. As shown in FIG. 15, in the present embodiment, punctuation mark recognition is accomplished by means of simple pattern recognition. More specifically, the distribution of black image elements is measured in the main scan direction and subscan direction of the extracted character, and a histogram is generated. When the character area is divided equally into four quadrants, a character showing a histogram of shape of the distribution of black image elements of only a single quadrant is extracted as the punctuation mark candidate. In the case of the character "○" shown in FIG. 15, the distribution of the black image elements occurs in only a single quadrant, and the pattern is recognized thereby as a punctuation mark. Of course, in regard to characters expressed by biased histograms, a punctuation mark recognition process may be accomplished by pattern matching method, feature extraction method (e.g., closed loop extraction method) or the like. Whatever the conventional method, it is unnecessary to store a plurality of reference character patterns for punctuation mark recognition. In the present embodiment, punctuation marks include the Japanese period ("。") Japanese comma "、", as well as the English period "." and comma ",".

As described above, the punctuation mark candidate is selected when executing all processes for each extracted character. When a punctuation mark candidate is not found, the same process is executed for the subsequent line.

In step S108, the punctuation mark position is determined for each punctuation mark candidate. In FIG. 15, for example, the third quadrant is determined to be the punctuation mark position. The aforesaid process is executed for each punctuation mark candidate. Thus, the position having the highest frequency of occurrence is determined from among the punctuation mark positions of each punctuation mark candidate as the punctuation mark position of the present document. Although there is a possibility of selecting a Japanese voiced sound symbol "゛" as a punctuation mark candidate, these are limited instances wherein a white space appears next to a voiced sound character (e.g., Japanese ど in hiragana), such that erroneous selection is preventable by selecting the position of highest frequency from among a plurality of punctuation mark candidates. When a small number of punctuation marks are included in an extracted line, selection may be made from among punctuation marks appearing in a plurality of lines.

In step S109, character direction and document type are discriminated based on punctuation mark position determined as previously described. The positions of punctuation marks within the extracted area may differ due to the direction of the character images including the punctuation marks, such that the direction of the character image can be determined based on whether or not the punctuation mark position is in any of the aforesaid first through fourth quadrants. In step S102 of FIG. 13, the original document can be determined to be either placed vertically or horizontally based on the aforesaid punctuation mark position and information related to the discriminated line direction (main scan direction a and subscan direction b).

FIG. 16 shows a method for determining character direction and document type in step S109 of 13. When, for example, the line direction is in the subscan direction, as shown in FIG. 16, the characters are determined to be horizontal writing in a downward direction when the punctuation mark position is in the first quadrant, vertical writing in a leftward direction when the punctuation mark position is in the second quadrant, horizontal writing in an upward direction when the punctuation mark position is in the third quadrant, and vertical writing in a rightward direction when the punctuation mark is in the fourth quadrant. Thus, character direction and document type (vertical writing, horizontal writing) can be determined.

By combining the document placement direction (vertical placement, horizontal placement) and line direction (main scan direction a,, subscan direction b) determined in step S102 in the aforesaid document management table DT, the direction of each line can be determined as to the short edge direction and long edge direction of the document. Accordingly, the document type (portrait or landscape) can be determined from the document type (vertical writing or horizontal writing) and line direction (short edge direction or long edge direction) determined in step S102 (refer to FIG. 17 for the determination method).

The document information determined above is written in the management table MT in step S110, and thereafter the routine returns.

As described above, character direction and document type are automatically determined by copying apparatus P, such that the direction of printout image may be optionally changed, for example, to a direction which is readily visible to a user, not to mention such that the direction of printout image corresponds to the direction of copy sheet even if the user set the document on the copying apparatus P in a random direction. Of course, this function to determine document information may be cancelable by operating a key on an operation panel. Further, the obtained document information may be displayed on a message panel or the like.

When an N-in-1 mode is selected in the copying apparatus P, N sheets of an original document can be copied on a single copy sheet by automatically manipulating the top and bottom of the original and arrangement of the original by determining the placement direction of the original and type of original. As an example, a 4-in-1 copy process for copying four A4 size original document sheets on a single A3 size copy sheet is described hereinafter. To simplify the description, the document types (portrait, landscape, vertical writing, horizontal writing) are uniform.

As shown in steps S1 and S2 of FIG. 9, image data for four sheets of an original document are stored in code memory 37 by CPU 3, and a process is executed by CPU 3 to write the image information for each document sheet in management table MT. As previously described, the placement direction of the four original document sheets may differ inasmuch as the character direction of each document is recognized, and may be rotated as necessary to render said image data uniform with the direction of data stored in code memory 37. Thereafter, the data are written to image memory 31 by said CPU 3.

Figure 18:
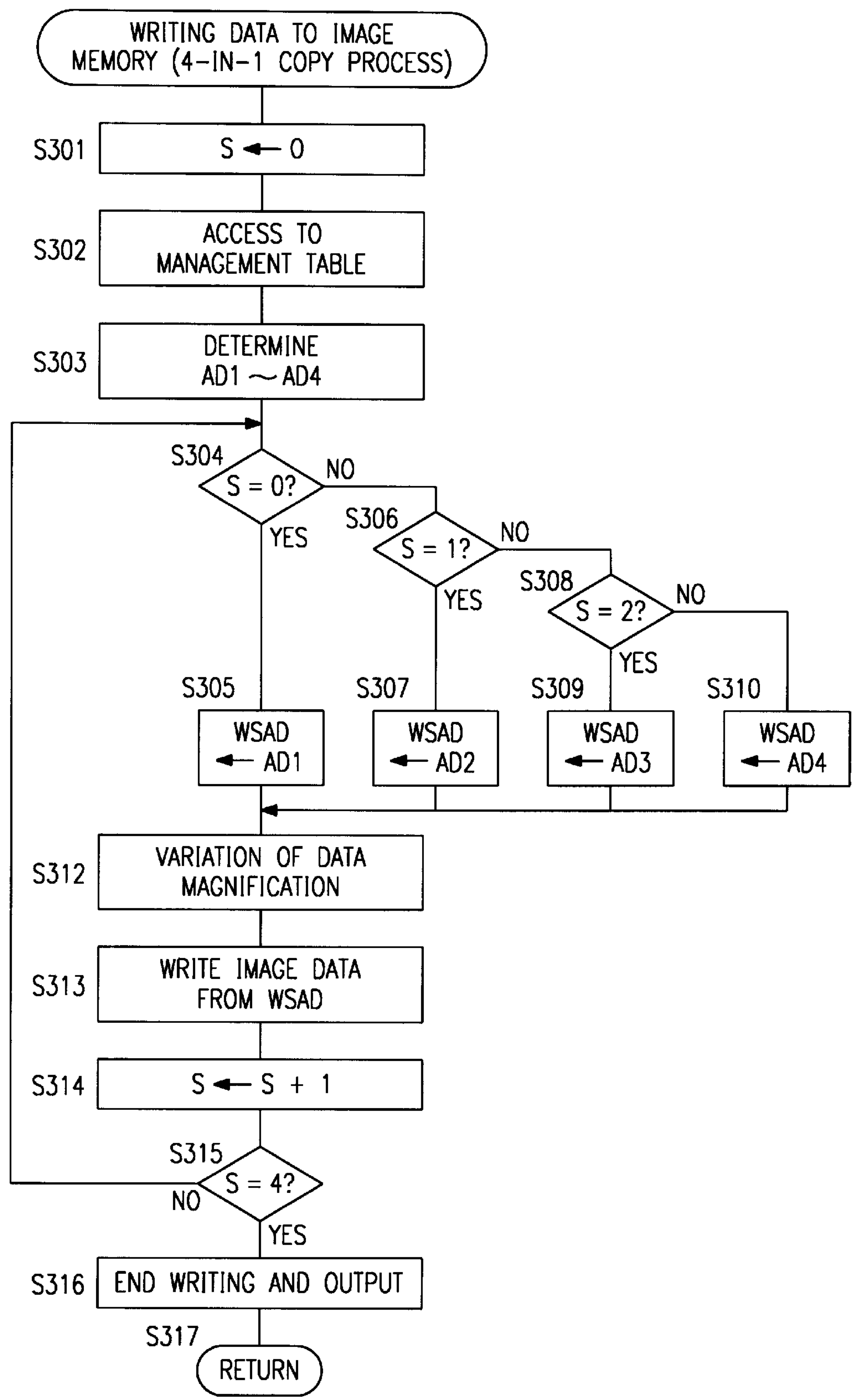
FIG. 18 is a flow chart showing the image data writing process to the image memory 31 when making a 4-in-1 copy.

FIG. 18 is a flow chart showing the process for writing data to the image memory by CPU 3 (step S3 of FIG. 9) in the case of 4-in-1 copying. As shown in FIG. 18, in step S301, a variable S is set at zero to specify the write start address, and image memory 31 is initialized.

In step S302, information relating to document type (vertical writing, horizontal writing, portrait, landscape) is read out from management table MT. In step S303, the write start address AD1~AD4 for each document is determined based on the aforesaid information, and stored in image memory 31. FIGS. 19A, 19B, 19C, and 19D show the method for determining addresses AD1~AD4 in step S303. As shown in FIGS. 19A, 19B, 19C, and 19D, write start addresses AD1~AD4 are determined by the document type. Image data of each document is written in the sequence AD1, AD2, AD3, AD4 from each address in the arrow direction shown in the drawing.

In steps S304~S310, the value of variable S is determined, the variable WSAD is substituted for an address among AD1~AD4 based on said variable S. In step S312, data are compressed to ¼, and the routine advances to step S313.

In step S313, the image data of one document page is written from WSAD to the image memory. Thereafter, in step S314, the value of variable S is incremented, and when it is determined in step S315 that the value of variable S has not attained 4, the routine returns to step S304, and the image data for the remaining three pages of the original document are written via the identical steps described above. Subsequently, when it is determined in step S315 that the value of variable S has attained 4, whereupon a signal is outputted in step S316 to indicate the writing process has completed.

Thus, the image data written to image memory 31 is read out by print process section 40, and printed out to complete the 4-in-1 copy process.

FIGS. 20A, 20B, 20C, and 20D show the result of the 4-in-1 copy process. As shown in FIGS. 20A, 20B, 20C, and 20D, the top and bottom of the four sheets of the original document are arranged in the same direction and copied on a single 4-in-1 copy sheet, and at the same time the arrangement sequence is changed in terms of the vertical and horizontal writing of the original. Of course, the four original document images may be arranged differently from FIGS. 20A, 20B, 20C, and 20D in accordance to the desire of a user.

The document information discrimination function of the present embodiment is not limited to the previously described image rotation process or N-in-1 process, inasmuch as it may be applied to copy processes requiring that changes of position in accordance with document placement position and document type, such as binding position, staple position and the like.

Although "。", "、", "." and "," have been used in the present embodiment as punctuation marks, it is to be noted that other characters may be used which has a simple construction, frequently occur in sentences and whose position changes depending on the directional orientation of said sentence. Even when the type (portrait, landscape, vertical writing, horizontal writing) of an original document of N pages is nonuniform, the direction of each image can be unified on a copy sheet. As to documents of different types from the other documents, the images can be reduced so as to be accommodated within a predetermined range on a copy sheet per single page of said original, thereby avoiding erroneous copies, and indicating when N-in-1 copies are unfeasible.

(2) Second Embodiment

In general, an indented line follows the end of each single paragraph to start a new paragraph. The latter part of the indented line is white space, which appears on the right side in the case of horizontal writing documents and appears on the bottom side in the case of vertical writing documents based on the aforesaid indentation. Accordingly, the directional orientation of character contained in a document, i.e., the direction of document placement, can be determined by knowing the distribution of the aforesaid white spaces within a document. From the aforesaid perspective, examples follow hereinafter of discriminating document information based on the distribution of white space within the text of said document.

Description of the construction of the copying apparatus of the present embodiment is identical to that previously described in the first embodiment and is, therefore, omitted herefrom. Only the processes executed by CPU 3 for discrimination of character direction are fully described below.

Figures 20A, 20B, 20C, 20D, 21:
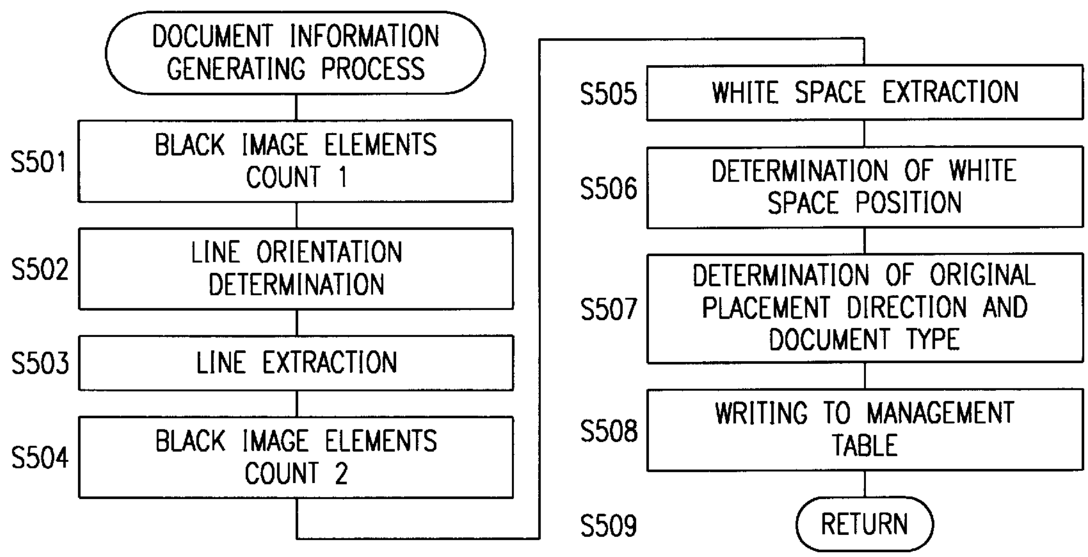
FIGS. 20A, 20B, 20C, and 20D are illustrations showing various types of completed 4-in-1 copy.
FIG. 21 is a flow chart showing the process of discriminating original document information of a second embodiment.

FIG. 21 is a flow chart showing the process for generating document information executed by CPU 3. As shown in FIG. 21, steps S501~S503 are identical to steps S101~S103 of the first embodiment shown in FIG. 13, for detecting line direction and line extraction. In step S504, the number of black image elements in the line character direction are counted, and their distribution is measured. In step S505, the white spaces are detected based on the aforesaid distribution.

Figure 22:
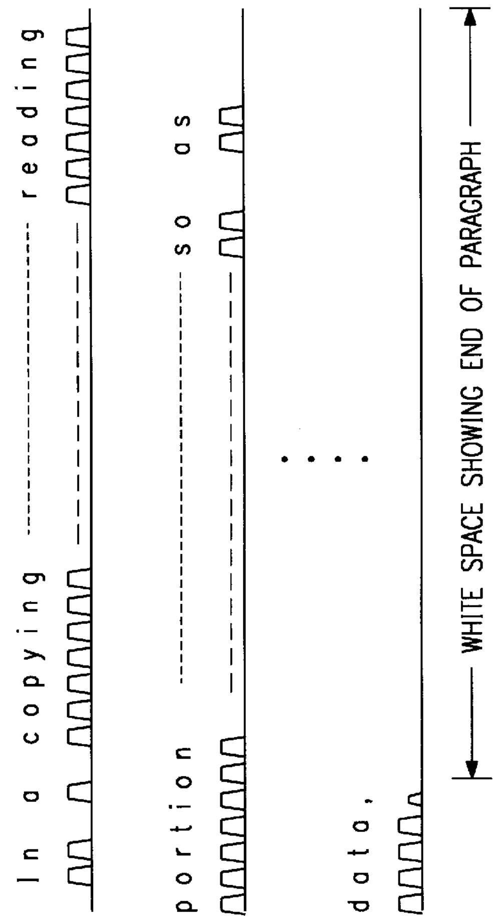
FIG. 22 is a plan view showing the method for detecting white space within the character image.

FIG. 22 shows the method of detecting white spaces of step S505. As shown in FIG. 22, the black image elements are counted for each extracted line in a direction parallel to the character direction. The parts equivalent to white spaces are blank relative to black image elements. These blanks are deemed to be white spaces. The length of the white spaces are detected, and a determination is made as to whether or not said length exceeds a predetermined value. When the predetermined value is exceeded, the white space is determined to be white space for starting a new paragraph. When the predetermined value is not exceeded, the white space is judged to not indicate a new paragraph.

In step S506, the majority of the white space positions is determined for each line having white space to start a new paragraph, and this majority is determined to be the white space position of the document. In step S507, character direction and document type are determined based on the aforesaid detected white space position.

Figure 23A:
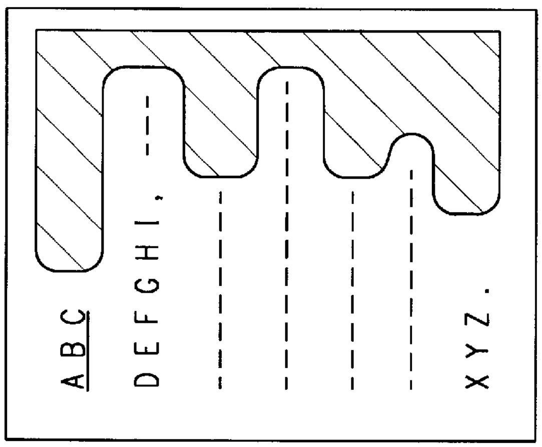
FIGS. 23A and 23B are plan views showing a method for discriminating directional orientation of lines.
Figure 23B:
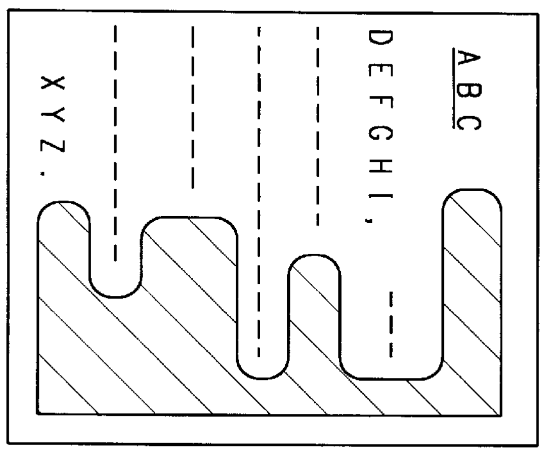

FIGS. 23A and 23B show examples of how a horizontal writing original document is subjected to the process of step S507. As shown in FIG. 23A, the character direction is determined to be upward when the white space position is on the right side, and as shown in FIG. 23B, the character direction is determined to be downward when the white space position is on the left side. Similarly, character direction is determined to be leftward when the white space position is on the top side, and character position is determined to be rightward when the white space position is on the bottom side. The determination can be made by measuring only those lines having a small total number of black image elements when extracting lines, without measuring the distribution of black image elements for all lines.

Therefore, document type (portrait, landscape) can be determined from the previously determined line direction and character direction by the same method described in the first embodiment.

As previously described, image data can be rotated to a predetermined direction via the determination of document information in the same manner as described in the first embodiment. Furthermore, an N-in-1 copy process can be accomplished with automatical uniformity of top and bottom and arrangement of the originals.

The method for determining character direction via white space extract in the present embodiment does not require pattern matching or the like, thereby accomplishing higher speed processing in a simple manner compared to methods using punctuation marks. In the present method, discrimination of vertical writing documents and horizontal writing documents is not performed, and said method is therefore suitable for languages that have only horizontal writing such as English, and languages having only vertical writing.

Although examples in the present embodiment have determined character direction by detecting white spaces accompanying new paragraphs, the present invention is not limited to this form. When, for example, many copies are made of manuscripts having a lot of white space in the leading portion of a line, the characters may be determined to be upward when the white space is on the left, that is, character direction may be determined from the shape and position of the white space present within an original document. Of course, the aforesaid relationships and correspondences can be optionally modified by a user.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading device comprising:

image reading means for reading an original document image and for outputting document image data;

extracting means for extracting character areas from the document image data outputted by said image reading means, each character area containing a single character;

detecting means for detecting which of the characters contained in the extracted character areas are punctuation marks; and determining means for determining a directional orientation of the original document image based on a location of each respective detected punctuation mark within its respective extracted character area, wherein said detecting means detects the punctuation marks by identifying each character, which is formed by image elements distributed in lust one quadrant of the respective extracted character area, as a punctuation mark.

2. An apparatus comprising:

image reading means for reading an original document image and for outputting document image data;

extracting means for extracting character areas from the document image data outputted by said image reading means, each character area containing a single character;

detecting means for detecting which of the characters contained in the extracted character areas are punctuation marks; and determining means for determining a directional orientation of the original document image based on a location of each respective detected punctuation mark within its respective extracted character area, wherein said detecting means detects the punctuation marks by identifying each character, which is formed by image elements distributed in lust one quadrant of the respective extracted character area, as a punctuation mark.

3. The apparatus as claimed in claim 2, further comprising an image rotator which is adapted to rotate, based on the directional orientation of the original document image as determined by said determining means, the document image data in order to provide rotated document image data.

4. The apparatus as claimed in claim 2, further comprising:

a mode selector for selecting a mode to print images of a plurality of original document images onto a single sheet of paper to make a composite copy;

distinction means for distinguishing whether the characters included in each respective original document image are in a vertically written direction or in a horizontally written direction based on the directional orientation of the respective original document image as determined by said determining means; and deciding means for deciding a printing arrangement, of the images of each of said plurality of original document images, on the single sheet of paper based on the directional orientation of the respective original document image as determined by said determining means and the written direction as determined by said distinction means.

5. A method of determining a directional orientation of an image comprising the steps of:

reading an original document image and providing document image data;

extracting character areas from the document image data, each character area containing a single character;

detecting which of the characters in the extracted character areas are punctuation marks by identifying each character, which is formed by image elements distributed in just one quadrant of the respective extracted character area, as a punctuation mark; and determining a directional orientation of the original document image based on a location of each detected punctuation mark in its respective character area.

* * * * *

UNITED STATES PATENT AND TRADEMARK OFFICE
CERTIFICATE OF CORRECTION

PATENT NO. : 6,011,877

DATED : January 4, 2000

INVENTOR(S) : Atsushi Ishikawa, et. al.

It is certified that error appears in the above-identified patent and that said Letters Patent is hereby corrected as shown below:

Column 13, line 59 (claim 1, line 17) delete "lust", and insert --just--.

Column 14, line 18 (claim 2, line 17) delete "lust", and insert --just--.

Signed and Sealed this

Eighth Day of May, 2001

Attest:

NICHOLAS P. GODICI

Attesting Officer

*Acting Director of the United States Patent and Trademark Office*